Oct. 20, 1970 V. M. ELLIOTT 3,534,973
COLLAPSIBLE RACK FOR SHOPPING CARTS
Filed July 9, 1968 2 Sheets-Sheet 2
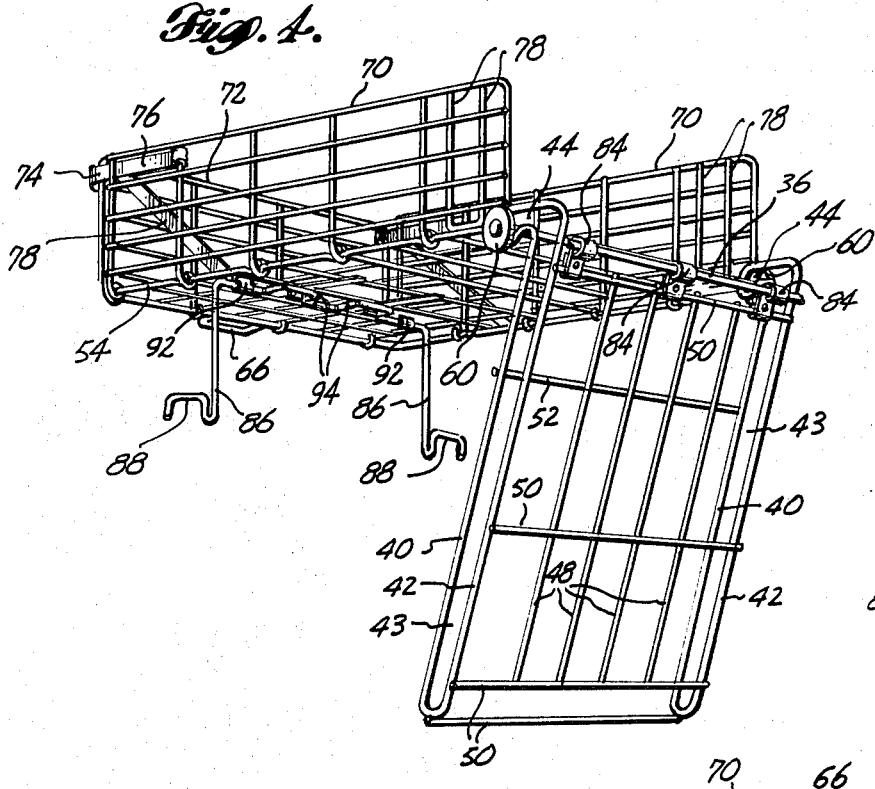
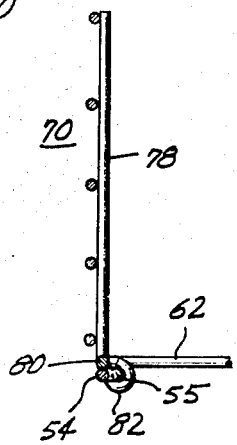
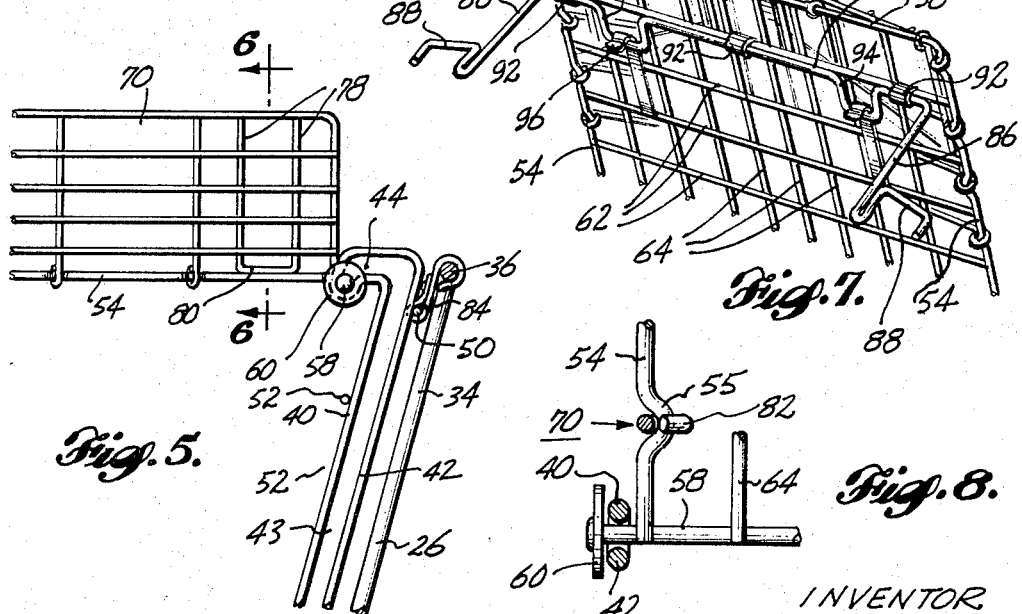
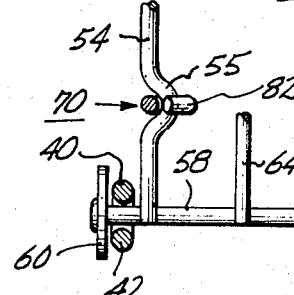
INVENTOR
VIRGLE M. ELLIOTT
BY Ford E. Smith
ATTORNEY United States Patent Office 3,534,973
Patented Oct. 20, 1970

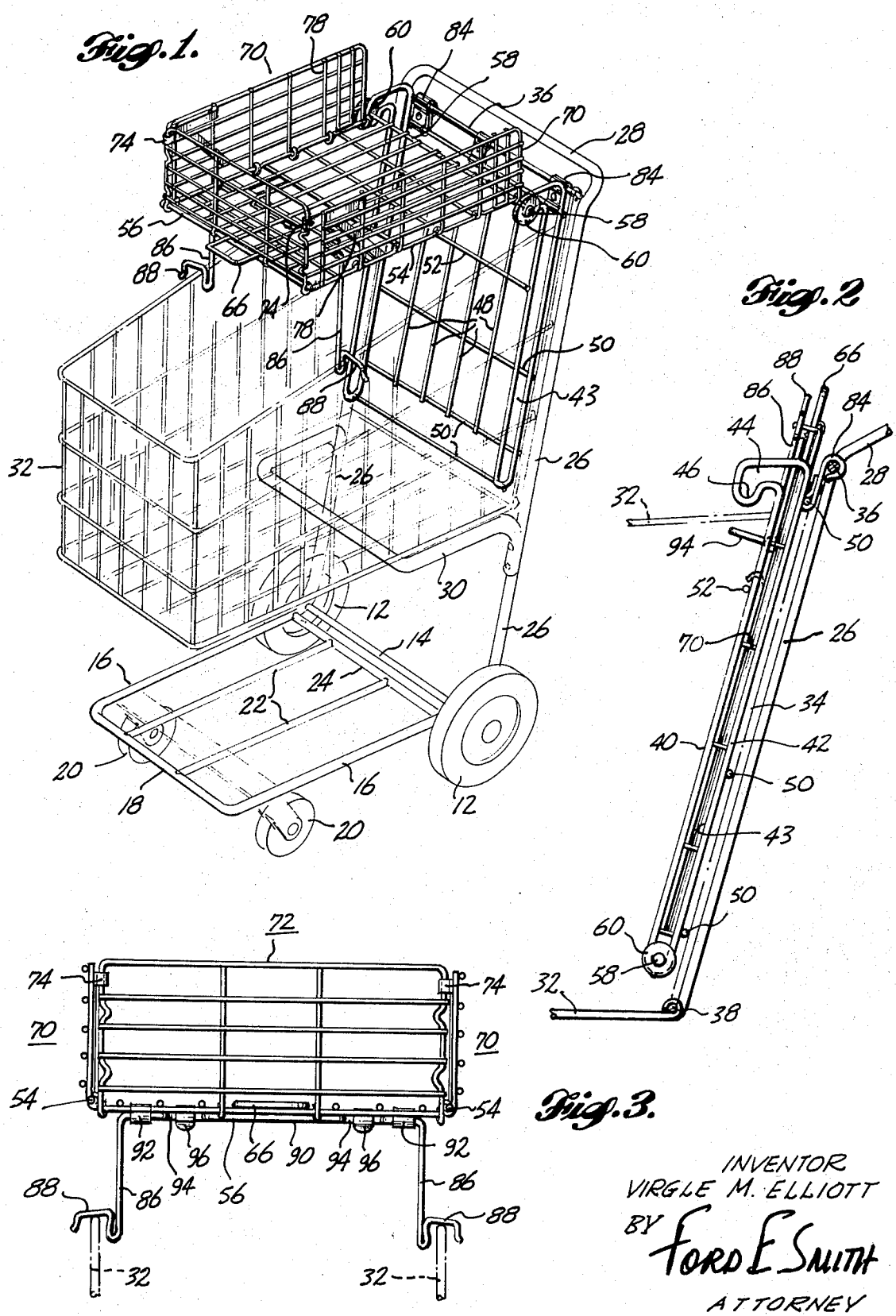

3,534,973
COLLAPSIBLE RACK FOR SHOPPING CARTS
Virgle Mengo Elliott, 3230 S. 259th Place,
Kent, Wash. 98031
Filed July 9, 1968, Ser. No. 743,346
Int. Cl. B62b 11/00
U.S. Cl. 280—33.99       5 Claims

ABSTRACT OF THE DISCLOSURE

A collapsible rack is provided for storage against the back wall of a main basket in a shopping cart. The collapsed rack is readily withdrawn from its storage position erected and disposed in overlying relation to the rear of the cart basket to increase the loading thereof and to provide a convenience for shoppers.

BACKGROUND

Generally, shopping carts have a lower wheeled frame forming a carrier deck. An upstanding frame, including a handle, rises above the lower wheeled deck and, in cantilever fashion supports a main basket. Typically, the main basket is tapered forwardly and has a rear wall which is hinged. By reason of such construction, several carts can be nested in line with the basket of a following inserted into the basket of a leading cart. There is a need for equipment or apparatus that will increase the capacity of the typical shopping cart in order, not only to accommodate large purchases often being made, but also to encourage larger purchases by a customer using such a cart in a shopping expedition. Such carts have in the past been provided with either fixed or folding infant seats, and some carts have included supplemental racks. However, the supplemental racks heretofore known either are fixed to the cart frame or the main basket in such location or manner as to be inconvenient to the use of such basket. Or they are mounted in out-of-the-way places where access to them is inconvenient. Or, if the supplemental racks are movable or removable, they are inconvenient to use and often interfere with the loading of the main basket or the lower deck, or in other ways are less than acceptable.

Accordingly, it is among the main objects of this invention in relation to shopping carts:

(a) To provide a supplementaly capacity-increasing rack which is collapsible;

(b) To provide a collapsible, compact supplemental rack which when stored out of use occupies no appreciable space;

(c) To provide a supplemental rack which is simple to withdraw from storage and to erect;

(d) To provide a supplemental rack which may be collapsed with but a single hand and simply moved to its storage position;

(e) To provide a supplemental rack which may be built into or attached to a shopping cart without materially altering the cart design or cart manufacturing procedures or echniques;

(f) To provide a supplemental rack which is sturdy and rugged and capable of withstanding hard use and abuse, will endure under overloading, and which has the capability of long service life with practically no maintenance; and (g) As will become more apparent during the course of the following specification and viewing the accompanying drawings, will satisfy many needs and requirements of the supermarket merchandising industry so widespread in this country.

SUMMARY OF THE INVENTION

A supplemental rack, disposable over the main basket of a shopping cart is collapsible for storage in the rear of the basket. The rack includes a panel to be disposed in load-supporting relation over at least the rear of the basket. Support means is provided between the panel at its front and the edges of the main basket. There are guideway follower means at the rear of the panel and guideway forming means are provided to guide the movement of the panel into and out of its storage position. Cradle means to support the rear of the panel when it is disposed over the basket are associated with the means forming the guideways. The rack may be built into the main basket back wall as an integral structure or it may be provided as an attachment apparatus.

DRAWINGS

FIG. 1 is a perspective view of a supplemental rack for a shopping cart according to this invention, attached to a shopping cart being shown in phantom;

FIG. 2 is an upright side view of a collapsed supplemental rack;

FIG. 3 is a front view of the supplemental rack;

FIG. 4 is a perspective view from beneath at the rear of a supplemental rack in its erect position;

FIG. 5 is a fragmentary, detail view of a portion of the side of the supplemental rack;

FIG. 6 is an enlarged cross-sectional detail taken in plane 6—6 of FIG. 5;

FIG. 7 is a perspective view from beneath the front end of the load-supporting panel of this supplemental rack; and FIG. 8 is a detail sketch of the rack as associated with certain guideways.

DESCRIPTION

Referring to FIG. 4, upright parallel rods 40, 42 form a guideway 43 that extends from a lower position within the cart upward. At its upper end guideway 43 turns to form L-shaped guideway 44 which includes a pivot or cradle recess 46. The boundaries of the guideway 44 are formed by extensions suitably shaped of bars or rods 40, 42. A pair of guideways 43 is employed in this structure. Bars 42 are connected by cross rods 50 at the bottom and on the back side and at the top. Upright rods 48 secured to the cross bars 50 form a grid panel between a pair of upright guideways 43. To the front of the guideways 43, cross rod 52 connects bars 40, 40 at a predetermined position below the guideway 44 for a purpose later described. This described structure is generally to be referred to as the storage rack or frame.

The load-supporting panel of the supplemental rack is formed by a peripheral frame comprising side bars 54, 54, front bar 56 and a rear cross bar 58. The ends of bar 58 extend beyond the side bars 54 and form trunnions which extend through guideways 43, 43 and constitute guideway follower means. Each such extending or protruding end of bar 58 is terminated with a washer 60 which prevents displacement of the bar ends 58 from the guideways. Between side bars 54, 54 extend a plurality of rods 62 across the panel. At right angles thereto are fore-and-aft rods 64 attached at their ends to cross bars 56 and 58 and either interwoven with or soldered to the grid bars 62. Thus, it will be seen the load-supporting panel is in effect an openwork grille or grid. A handle 66 for manipulating the panel extends forward of front bar 56.

At the sides of the load-supporting panel are foldable sidewalls 70, 70 formed of grid structure. Each wall 70 is pivoted to a side bar 54 so that they may either lie in close juxtaposition to the load-supporting panel as shown in FIG. 7, or they may be erected to enclose articles thereon, all as shown in FIGS. 1, 3, 4 and 5.

A front wall 72 is hinged to the front cross bar 56 of the load-supporting panel. The length of the front wall 72 is such that it may first be folded down between sidewalls 70, 70, and then the latter walls fold to overlie the front wall as well as the load-supporting panel when the supplemental rack is in collapsed condition, as shown in FIGS. 2 and 7. Hooks 74, 74 on straps 76, secured at the front of each sidewall 70, are engaged by and retain the front wall 72 when it is swung into its erect position. Angle straps 78 on the inner surface of the sidewall reduce friction and avoid any tendency for the front wall to hang up as it is being swung to the upright position. Preferably, there is space between the inner edges of the folded-down sidewalls 70, 70 into which a person may insert his fingers to grasp the upper edge of the folded front wall 72. A lifting of the same brings about an erection of all three walls simultaneously and practically automatic engagement of the front wall at its upper corners with the hooks 74.

In FIGS. 4 and 5 will be seen a U-shaped wire member 78 attached to the inner surface of each sidewall 70. Member 78 has a lower cross bar 80 which is so arranged, as shown in FIG. 6, with relation to a side bar 54 that a "bind" occurs when the wall 70 is erect. Swinging of sidewall 70 outward past the vertical is prevented or precluded. This is accomplished by arranging that the pivot centers of sidewall 70 is inward of the main course of side bar 54. This is accomplished by providing inward bends 55 in side bars 54 (see FIG. 6) and, at that point, engaging a sidewall hook 82 therearound.

At the rear of the storage rack and between the guideways 43, 43 are hook shaped clips 84 which engage over cross bar 36 of the back wall of the main basket and attach the supplemental rack and its storage rack thereto.

When the rack is in the erect position of FIGS. 1, 4 and 5, the extended ends of rear bar 58 of the load-supporting panel is engaged in the cradling notches 46 at the forward end of guideway 44 and is thereby supported. The forward end of the load-supporting panel has a pair of legs 86, 86 each having a hook 88 which engages over the upper edge of the main basket of the shopping cart. Legs 86, 86 are joined to the underside of the load-supporting panel by a cross bar 90 pivotally attached by clips engaged over cross bar 90. Offset bends 94 in cross bar 90 engage and are retained by spring hooks 96 mounted on the underneath side of the load-supporting panel. By overcoming the force of spring hooks 96, 96 the legs may be collapsed to the condition shown in FIG. 2.

OPERATION

When a shopper having the supplemental rack erect and loaded, as shown in FIG. 1, presents himself with his loaded shopping cart at a check-out counter, it is customary for the checker to first unload the supplemental rack. He then collapses the forward wall 72 whereupon sidewalls 70, 70 collapse thereover. Merely by shoving the panel rearward and lifting its front end, the rack may be moved toward the storage position. Trunnions on the rear bar 58 pass upward and rearward out of the notches 46 through guideways 44 and then begin their descent in guideways 43. The rear of the collapsed load-supporting panel will almost immediately drop until the bottom of the panel contacts the cross bar 52, shown in FIG. 2. At that point an upward lift and swing of the front of the collapsed rack will bring it into substantial alignment with guideways 43 of the storage rack to such an extent that when the checker may release the rack and it will automatically fall into place in the storage rack. The main basket will then be fully accessible for unloading and checking of articles therein.

The supplemental rack panel with its collapsed sidewalls is withdrawn from the storage rack merely by reversing the procedure described.

The structure disclosed has been of a supplemental rack provided as a shopping cart attachment. In those cases where the cart rear wall, having the storage rack secured to it, is pivoted at a lower point so it swings forward as to provide an infant's seat, the storage rack is merely advanced deeper into the main basket. Its operation is not otherwise altered. When the storage rack is incorporated into or attached to a shopping cart of the nesting type, the storage rack swings upward with the basket rear wall and does not hinder nesting.

The collapsed load-carrying rack disposed in the storage rack occupies nominal space in the main basket and may only reduce its capacity by about one inch across the back.

Although a particular preferred embodiment of the invention has been specifically disclosed for illustrative purposes, it will be understood that variations and modifications may occur to others or be required to apply the invention under other circumstances. All such as fall within the spirit and scope of the following claims are contemplated as part of the exclusive property or privilege patented hereby.

What is claimed is:

1. In a supermarket cart having a main basket,
    a supplemental rack normally stored juxtaposed to the rear wall of the main basket of such a cart when not in use;
    means between said basket and the rear edge of said rack operable to guide movement of the rear edge of said rack and permit horizontal disposition of the rack above the basket; and
    means between said basket and both ends of said rack to support said rack disposed over the basket.

2. The structure according to claim 1 in which said rack has foldable marginal walls to contain articles disposed thereon.

3. A supplemental rack for supermarket carts having a main basket, comprising:
    rack receiving means disposed in the rear of said cart basket and secured to the rear wall thereof, said means including a pair of opposed upright guideways;
    a rack bottom panel movable between a position where said panel is disposed within said rack receiving means and a position where said panel is disposed over said basket, said panel including guideway follower means co-operatively associated with said guideways;
    means adjacent the upper ends of said guideways to receive said guideway follower means for supporting the rear of said panel when the same is disposed over said basket; and
    leg means in supporting relation between said basket and the front of said panel.

4. The structure according to claim 3 in which there is folding enclosure means on said bottom panel to upstand when the bottom panel is disposed over said basket.

5. For use with nestable supermarket carts in which there is a main basket disposed forward of a push bar and having an upawrdly hinged rear wall, a supplemental rack disposable over said basket and for storage in the rear of said basket, comprising:
- a rack including a load-supporting panel to be disposed in load supporting relation over at least the rear of said basket;
- means in supporting relation between said basket and the front of said panel;
- guideway follower means on the rear of said panel;
- rack receiving means secured to the rear wall of said basket, including cradle means to support said guideway follower means when said panel is disposed over said basket; and
- said rack receiving means also including guideway cooperable with said guideway follower means to guide said bottom panel as the same is lowered into said rack receiving means.

References Cited

UNITED STATES PATENTS

| | | | |
|---|---|---|---|
| 1,518,497 | 12/1924 | Flood et al. | 280—79.3 XR |
| 2,212,053 | 8/1940 | Smith | 280—36 |
| 2,590,285 | 3/1952 | Wiltshire | 280—33.99 |
| 3,039,783 | 6/1962 | Stanley | 280—33.99 |

FOREIGN PATENTS 1,335,086  7/1963  France.

BENJAMIN HERSH, Primary Examiner

M. L. SMITH, Assistant Examiner

U.S. Cl. X.R.

280—47.35